United States Patent
Thielicke et al.

(10) Patent No.: US 9,733,109 B2
(45) Date of Patent: Aug. 15, 2017

(54) ABSOLUTE POSITION-MEASURING DEVICE

(71) Applicant: DR. JOHANNES HEIDENHAIN GMBH, Traunreut (DE)

(72) Inventors: Ernst Thielicke, Traunstein (DE); Daniel Auer, Traunstein (DE); Erwin Bratzdrum, Surberg (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 476 days.

(21) Appl. No.: 14/493,978

(22) Filed: Sep. 23, 2014

(65) Prior Publication Data
US 2015/0088451 A1  Mar. 26, 2015

(30) Foreign Application Priority Data
Sep. 24, 2013  (DE) .................... 10 2013 219 099

(51) Int. Cl.
*G01D 3/08* (2006.01)
*G01D 5/00* (2006.01)
*G01D 9/00* (2006.01)

(52) U.S. Cl.
CPC .............. *G01D 9/00* (2013.01); *G01D 3/08* (2013.01); *G01D 5/00* (2013.01)

(58) Field of Classification Search
CPC ........................................................ G01D 3/08
See application file for complete search history.

(56) References Cited

U.S. PATENT DOCUMENTS 5,687,103 A  11/1997  Hagl et al.
6,430,257 B1 *  8/2002  Bruun ................ B23K 26/04
                                                378/86

(Continued)

FOREIGN PATENT DOCUMENTS

DE  10 2012 218 890  4/2014
EP  0 660 209  6/1995

(Continued)

OTHER PUBLICATIONS

European Search Report issued in European Patent Application No. 14 17 3436, dated Feb. 6, 2015.

*Primary Examiner* — Manuel Rivera Vargas
(74) *Attorney, Agent, or Firm* — Andrews Kurth Kenyon LLP

(57) ABSTRACT

A position-measuring device includes: a first subassembly having a measuring standard on which at least one coded track is provided, and a scanning unit, which is able to generate position signals that may be used to generate an absolute digital position value by scanning the at least one coded track in a measuring direction; a second subassembly having at least one peripheral unit adapted to execute a supplementary or an auxiliary functionality of the position-measuring device; and a plurality of electrical lines, which connect the first subassembly and the second subassembly to each other for the transmission of electrical signals. The position-measuring device is able to be operated in an initialization mode and in a standard operating mode. All components of the first subassembly required for the operation in the standard operating mode are components that are suitable for use in a radiation region of a machine. Furthermore, an initialization memory is provided in the first subassembly, which includes the data required for the operation in the standard operating mode and which is not suitable for use in a radiation region of a machine. In the initializa- (Continued)

tion mode, the content of the initialization memory is transmittable to a memory unit situated outside the radiation region. Only the content of the memory unit is used for the operation in the standard operating mode.

14 Claims, 6 Drawing Sheets

(56) References Cited

U.S. PATENT DOCUMENTS

| | | |
|---|---|---|
| 7,274,305 B1 | 9/2007 | Luttrell |
| 7,965,073 B2 | 6/2011 | Steinich |
| 2002/0135359 A1* | 9/2002 | Steinich .................. G01B 7/003 324/207.13 |
| 2006/0237649 A1 | 10/2006 | Gates et al. |
| 2014/0101955 A1 | 4/2014 | Auer et al. |

FOREIGN PATENT DOCUMENTS

| | | |
|---|---|---|
| JP | 56-4008 | 1/1981 |
| WO | 2006/069786 | 7/2006 |

* cited by examiner

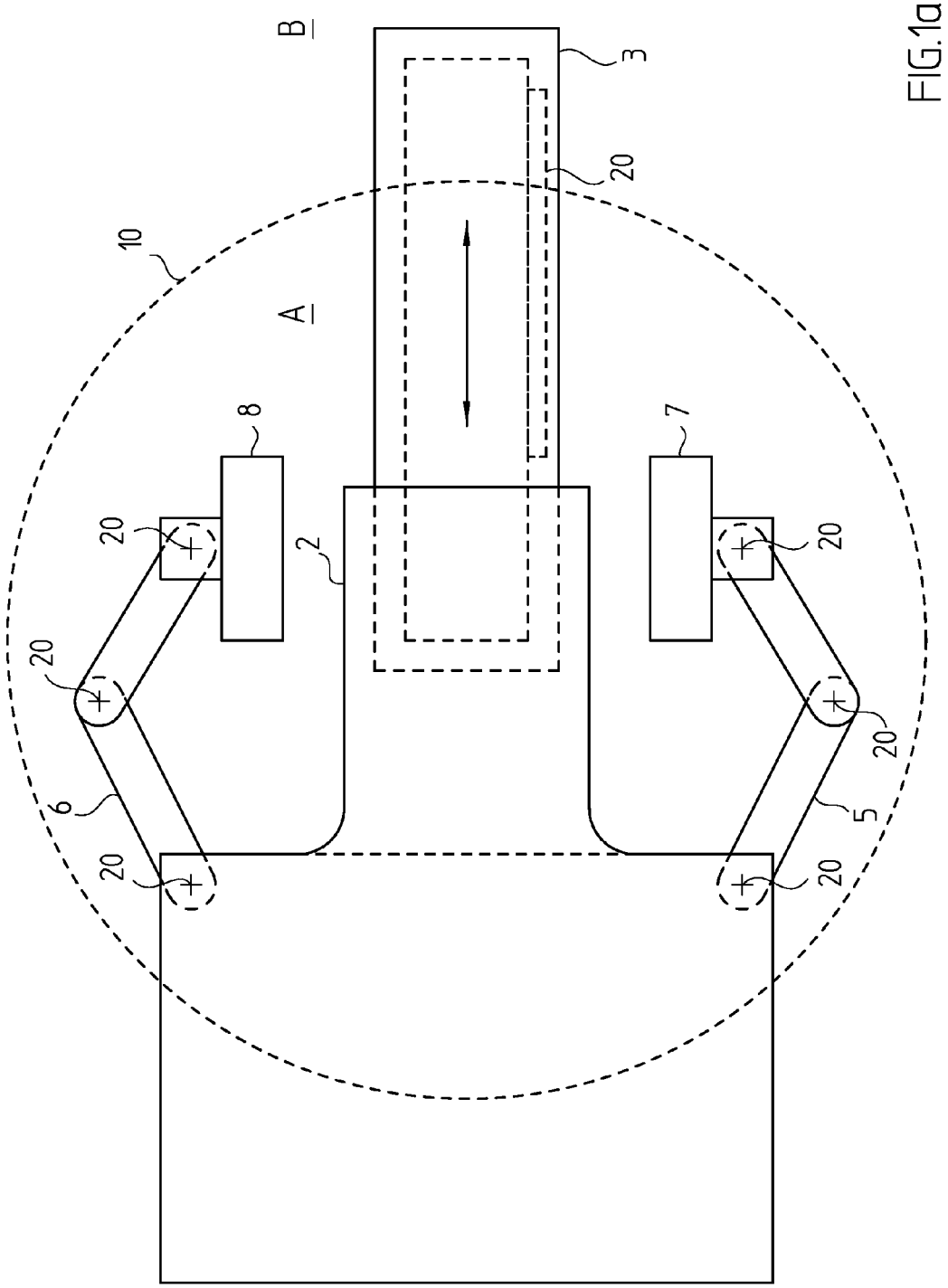

ABSOLUTE POSITION-MEASURING DEVICE

CROSS-REFERENCE TO RELATED APPLICATIONS

The present application claims priority to Application No. 10 2013 219 099.9, filed in the Federal Republic of Germany on Sep. 24, 2013, which is expressly incorporated herein in its entirety by reference thereto.

FIELD OF THE INVENTION

The present invention relates to an absolute position-measuring device, and to a method for operating a position-measuring device. Absolute position-measuring devices, as described herein, are suitable for use in systems or machines in which it is exposed to high-energy ionizing radiation.

BACKGROUND INFORMATION

Position-measuring devices are required in a wide variety of technical fields in order to determine the position (length and/or angle) of movable components in systems and machines. Based on their functional principle, position-measuring devices of this type are subdivided into two groups. There are, for example, incremental position-measuring devices, in which the position is determined by counting graduation periods of an incremental graduation. There are also absolute position-measuring devices, in which the position is obtained by scanning and analyzing an absolute graduation.

In contrast to absolute position-measuring devices, incremental position-measuring devices have a simple, robust design, but the drawback that no positional information is available directly following the switch-on operation, and it is necessary to first cross a reference mark in a so-called reference run before the absolute position can be inferred. For this reason, absolute position-measuring devices, in which an absolute position value is available at all times, also immediately after the device is switched on, have since become the preferred choice in many technical fields. An absolute position-measuring device is described, for example, in European Published Patent Application No. 0 660 209.

A technical field in which the use of absolute position-measuring devices continues to be problematic concerns systems or machines that are exposed to ionizing high-energy radiation, or whose application field requires the use of such radiation. Especially the field of medical technology should be mentioned in this context, where ionizing high-energy radiation is selectively used to treat diseases or to delay their progression. Gamma radiation, X-ray radiation or particle radiation (protons, neutrons, electrons etc.) are predominantly used in this regard.

Incremental position-measuring devices that are exposed to such radiation exhibit a fairly robust response due to their simple design. On the other hand, absolute position-measuring devices, which require a more complex design to determine an absolute positional value, tend to fail when exposed to ionizing, high-energy radiation. Memory components are especially problematic, since memory content may change under the influence of radiation. The failures caused by this problem are frequently difficult to understand because of the inconsistent error images they create.

German Published Patent Application No. 10 2012 218 890 describes an absolute position-measuring device, which may be suitable for use in an environment in which it may be exposed to ionizing high-energy radiation. It includes two subassemblies, in which a first subassembly includes functional blocks used directly for a position measurement, and a second subassembly including functional blocks that perform auxiliary and supplementary functions. The first subassembly is completely made up of so-called radiation-hardened components, e.g., components that are suitable for use in a radiation region of a machine. Because the second subassembly can be situated in a separate location from the first subassembly and thus outside the radiation region of the machine, the second subassembly may be made up of conventional components. This separation of the functions of the position-measuring device provides a favorable cost/benefit ratio.

This also applies to the service case, because the exchange of one of the subassemblies may possibly be sufficient. In practice, the subassembly to be exchanged will frequently involve the first subassembly, not only because it is operated in the environment of ionizing high-energy radiation, but also because this subassembly is exposed to mechanical wear, temperature fluctuations, etc.

The manufacturer frequently assigns data to the first subassembly that are required for operating the position-measuring device. The data may involve information regarding the technical specifications (resolution, interface protocol, type designation, etc.), which are also referred to as electronic nameplates. In addition, these data may include calibration values required to optimize the accuracy of the position-measuring device. Since the use of memory components is problematic for the aforementioned reasons, the manufacturer of the position-measuring device or the first subassembly must supply these data separately from the device, e.g., stored on a data carrier (DVD-ROM, CD-ROM, etc.) or in the form of a hard copy.

A service technician handling the exchange of the first subassembly must then also copy the supplied data to the location where they are required for operating the position-measuring device, e.g., either into the second subassembly (where memory chips may be used because it is operated outside the radiation region of the machine), or into the sequential electronics to which the position-measuring device is connected (e.g., a numerical control). However, this procedure is undesired because it is complicated and prone to errors.

SUMMARY

Example embodiments of the present invention provide a absolute position-measuring device that is easy to service, and example embodiments of the present invention provide a method for the safe initialization of such a position-measuring device.

According to example embodiments of the present invention, an absolute position-measuring device includes: a first subassembly having a measuring standard on which at least one coded track is arranged, and a scanning unit, which is able to generate position signals that may be used to generate an absolute digital position value by scanning the at least one coded track in a measuring direction; a second subassembly having at least one peripheral unit, which is adapted to execute a supplementary or an auxiliary functionality of the position-measuring device; and a plurality of electrical lines, which connect the first subassembly and the second subassembly to each other for the transmission of electrical signals. It is possible to operate the position-measuring device in an initialization mode and in a standard operating mode, and all components of the first subassembly required for the operation in the standard operating mode are components that are suitable for use in a radiation region of a machine. Furthermore, an initialization memory is provided in the first subassembly, which includes data required for the operation in the standard operating mode and which is not suitable for use in a radiation region of a machine and in the initialization mode, the content of the initialization memory being transmittable to a memory unit that is disposed outside the radiation region and the content of the memory unit being used for the operation in the standard operating mode.

According to example embodiments of the present invention, a method is provided for operating an absolute position-measuring device. A first subassembly includes a measuring standard on which at least one coded track is arranged, and a scanning unit, which is able to generate position signals that can be used to generate an absolute digital positional value by scanning the at least one coded track in a measuring direction. A second subassembly includes at least one peripheral unit, which is adapted to execute a supplementary or an auxiliary functionality of the position-measuring device, and a plurality of electrical lines connect the first subassembly and the second subassembly to each other for the transmission of electrical signals. It is possible to operate the position-measuring device in an initialization mode and a standard operating mode, and all components of the first subassembly required for the operation in the standard operating mode are components that are suitable for use in a radiation region of a machine. Furthermore, an initialization memory is provided in the first subassembly, which includes data required for the operation in the standard operating mode and which is not suitable for use in a radiation region of a machine. According to the method, in the initialization mode, the content of the initialization memory is transmitted to a memory unit that is arranged outside the radiation region, and the content of the memory unit is used for the operation in the standard operating mode.

Further features and aspects of example embodiments of the present invention are described in more detail below with reference to the appended Figures.

BRIEF DESCRIPTION OF THE DRAWINGS

FIG. 1a is a schematic plan view of a medical radiation device.

DETAILED DESCRIPTION

Figure 1B:
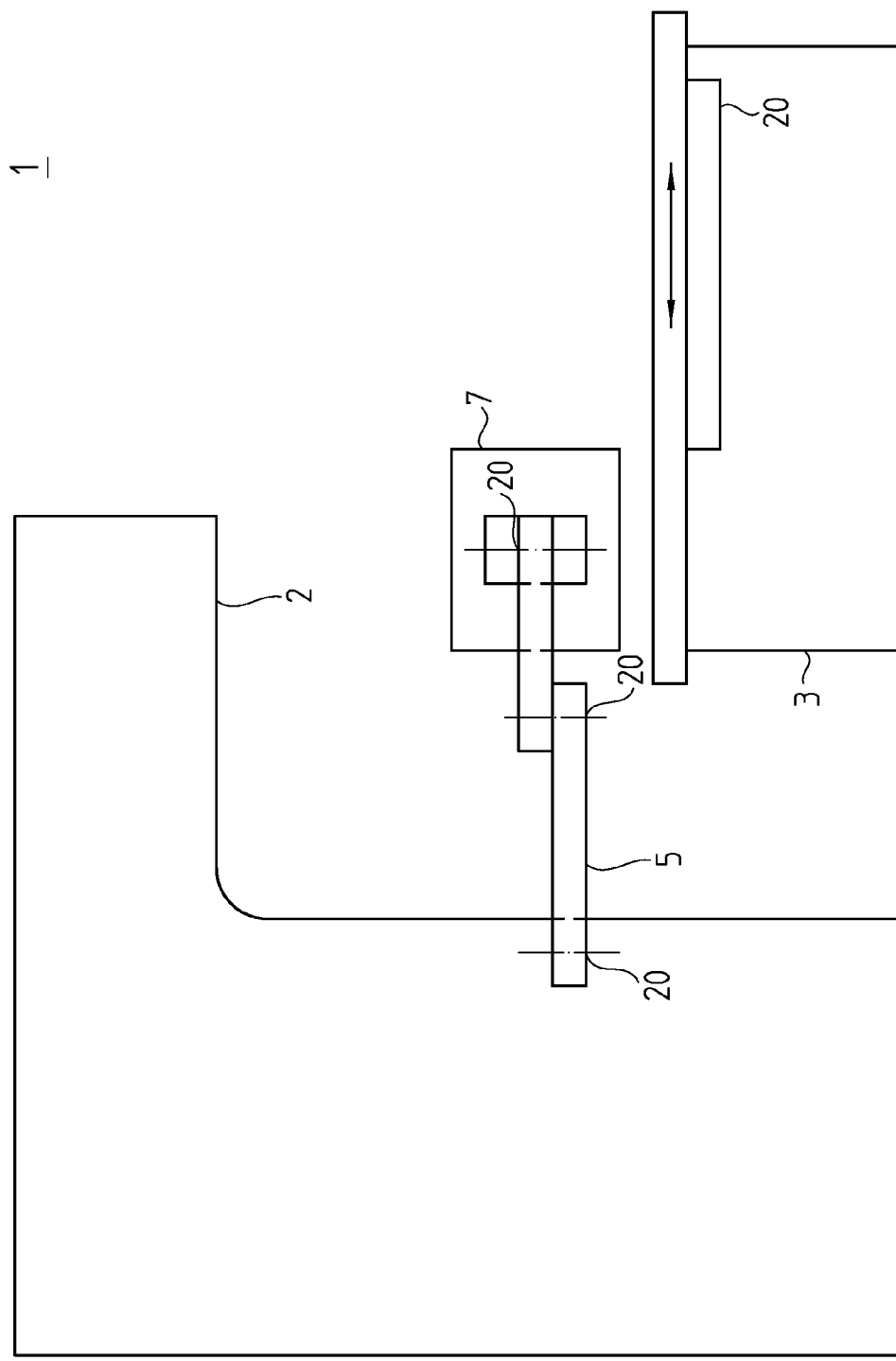
FIG. 1b is a schematic side view of a medical radiation device.

FIG. 1a is a schematic plan view and FIG. 1b is a schematic side view of a medical radiation device 1 as examples of a system in which ionizing high-energy radiation is used, especially gamma radiation, x-ray radiation or electron radiation. A radiation source 2 of radiation device 1 is arranged above the illustrated head end of a patient examination table 3. For clarity, a detailed depiction of the radiation source is omitted. It should be understood that the ionizing, high-energy radiation used for the radiation treatment of a tumor, for example, may occur predominantly within circle 10 illustrated in FIG. 1a. The area within circle 10 is therefore referred to below as radiation region A. Outside radiation region A, and thus outside circle 10, there is a radiation-proof region B.

The foregoing subdivision is greatly simplified and is mainly used for illustrative purposes. In practice, the energy of the occurring radiation decreases with rising distance from the radiation source, so that no exact boundary line can be drawn. For the following discussion, radiation region A means the region of a system in which ionizing, high-energy radiation may occur at a dose that could have an adverse effect on the functional reliability of a conventional absolute position-measuring device. On the other hand, a radiation-proof region B describes the area around a system in which the functional reliability of conventional absolute position-measuring devices is not affected by the occurring radiation.

In addition to maintaining a certain minimum distance from the radiation source, a radiation-proof region B may also be created by introducing a shielding barrier in the propagation direction of the radiation. Lead, for example, is a particularly suitable material for this purpose.

Two robot arms 5 and 6 are provided on the medical radiation device, the first robot arm 5 supporting a transmitter unit 7, and the second robot arm 6 supporting a receiver unit 8 of a computer tomograph (CT). Robot arms 5, 6 are used for the precise positioning of transmitter unit 7 and receiver unit 8 with the aid of servomotors, their position being determined by position-measuring devices 20, e.g. rotary transducers or angle-measuring devices disposed in the joints of robot arms 5, 6.

The patient examination table is movable in the direction of the illustrated arrow, and its position is measured with the aid of a further position-measuring device 20, e.g., a linear measuring device.

In some instances, such medical radiation devices already use radiation energy of more than 20 MeV. As a result, a considerable radiation dose may be introduced into position-measuring devices 20 over the service life of such a device. The used radiation may be gamma radiation, x-ray radiation or particle radiation (protons, neurons, electrons, etc.).

Figure 2:
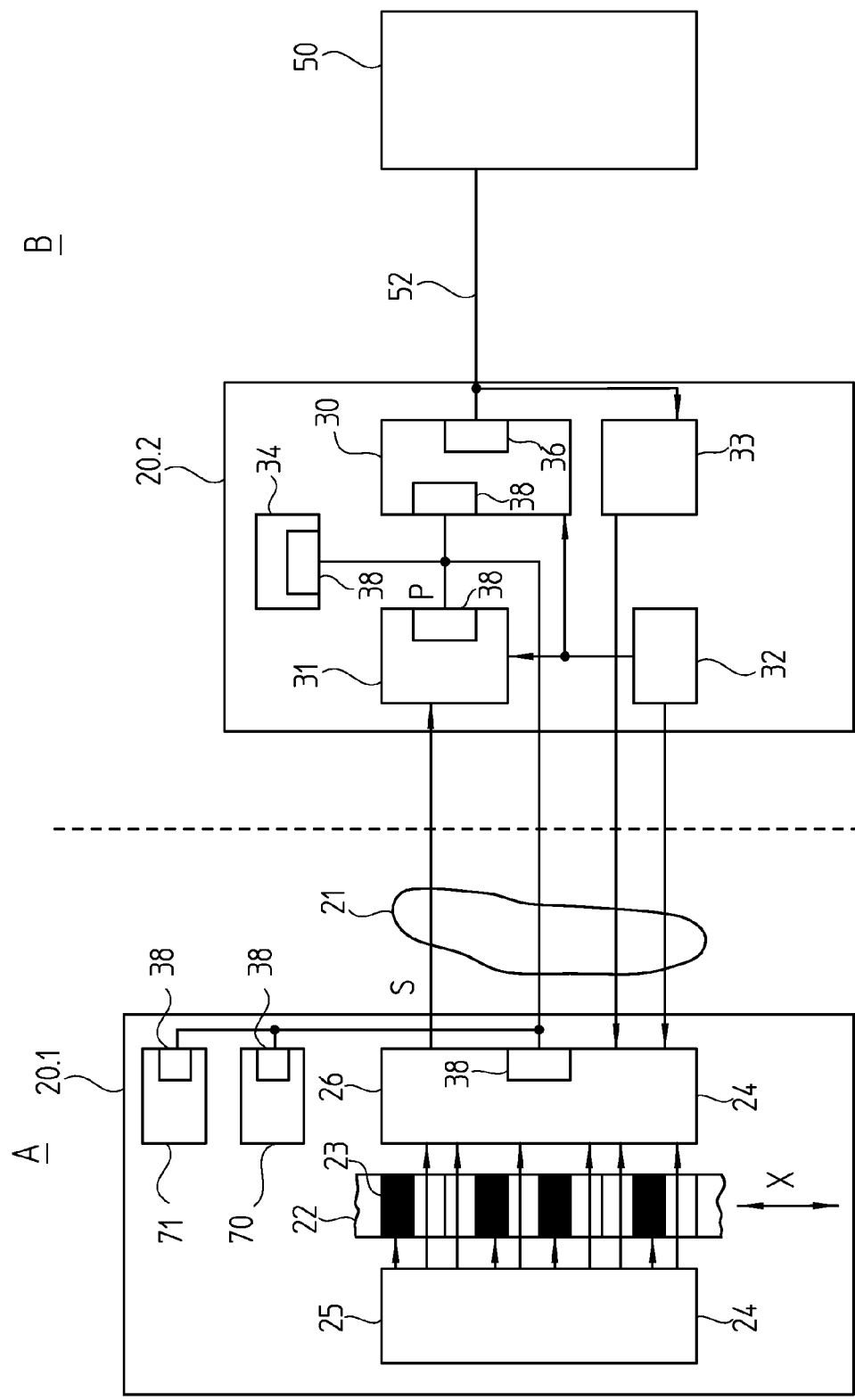
FIG. 2 is a block diagram of a position-measuring device according to an example embodiment of the present invention.

FIG. 2 is a block diagram of a position-measuring device 20 according to an example embodiment of the present invention, which is suitable for use in a system in which position-measuring device 20 may be exposed to ionizing, high-energy radiation. Position-measuring device 20 includes a first subassembly 20.1 and a second subassembly 20.2. To transmit electrical signals between first subassembly 20.1 and second subassembly 20.2, the subassemblies are interconnected via a plurality of electrical lines 21. First subassembly 20.1 is used in radiation region A (to the left of the perpendicular dashed line in FIG. 2), and second subassembly 20.2 is used in the radiation-proof region B of a machine or system.

To generate position signals S that are able to be processed into an absolute position value P, first subassembly 20.1 includes a measuring standard 22 having at least one coded track 23, as well as a scanning unit 24 for scanning the at least one coded track 23. Coded track 23 may be encoded in a parallel manner (e. g., Gray code) or, as illustrated in FIG. 2, in a serial manner (Pseudo Random Code PRC). However, the encoding may also be implemented in an analog manner, such as by multiple parallel coded tracks 23 that have a different graduation period (Vernier principle). Measuring standard 22 and scanning unit 24 are disposed in a manner allowing movement relative to each other in a measuring direction X.

If position-measuring device 20 is arranged as a linear measuring device, then measuring standard 22, for example, is a scale on which coded track 23 is applied. In a rotary transducer or angle-measuring device, measuring standard 22 is usually implemented as circular disk, and coded track 23 is disposed in the form of a ring around the center of the disk.

In this exemplary embodiment, it is assumed that position-measuring device 20 is operating according to the optical transmitted-light principle, e.g., the positional information of coded track 23 is encoded by a sequence of transparent and opaque regions, and scanning unit 24 includes a light source 25 provided on one side of measuring standard 22, which radiates light in the direction of coded track 23, and a detector unit 26, which generates position signals S from the light modulated by coded track 23. Position signals S may be present both in analog and digital form and are suitable as basis for generating an absolute digital position value P.

In addition to the optical scanning principle, other scanning principles are usable as well, especially magnetic, capacitive or inductive principles. In the same manner, it is possible to use an optical incident light principle, in which coded track 23 is made up of reflective and non-reflective regions and light source 25 and detector unit 26 are therefore provided on a side of measuring standard 22.

An initialization memory 70 may be provided in first subassembly 20.1. It includes data that are relevant for the operation of position-measuring device 20, such as information in connection with technical specifications (resolution, interface protocol, type designation, etc.) or calibration values. Initialization memory 70 is programmed by the manufacturer of position-measuring device 20, specifically the manufacturer of first subassembly 20.1, and its content can be read out via an interface 38. Because the data relevant for the operation are also always supplied in the service case when first subassembly 20.1 needs to be exchanged, the renewed startup of position-measuring device 20 is able to be simplified, as shown below, such that configuration errors are virtually impossible.

Second subassembly 20.2 includes peripheral units of position-measuring device 20 that perform supplementary or auxiliary functions. For example, second subassembly 20.2 may include a communications unit 30, a signal-processing unit 31, a reset unit 32, a voltage-supply unit 33, and a memory unit 34.

At least a few of the peripheral units (in this exemplary embodiment, communications unit 30, signal-processing unit 31, and memory unit 34) as well as scanning unit 24 or detector unit 26 in first subassembly 20.1 have an internal interface 38. The interface of initialization memory 70 is likewise an internal interface 38. In addition, scanning unit 24 may include an internal interface 38. All internal interfaces 38 are interconnected via suitable signal lines. Internal interfaces 38 provide the physical prerequisites for a communication and are suitably adapted for the transmission of data according to the rules of an interface protocol. The data transmission may be carried out in a parallel or serial manner.

On the one side, communications unit 30 provides a digital device interface 36, via which the communication with a control unit 50 takes place, at which position-measuring device 20 is operated. Device interface 36, for one, includes the physical preconditions for the communication (signal level, data rate, plug connector, etc.) and, for another, it includes a communications protocol that specifies the communication rules between position-measuring device 20 and control unit 50. Device interface 36 may be arranged as a serial, e.g., synchronous-serial, interface, and the signals are transmitted differentially, in a conventional manner, such as according to the RS-485 standard. Second subassembly 20.2 and control unit 50 are interconnected via a suitable data transmission cable 52.

As mentioned above, on the other side, communication unit 30 provides an internal interface 38 that is suitable for communicating with peripheral units of second subassembly 20.2 (in the illustrated example, with signal-processing unit 31 and memory unit 34) and with first subassembly 20.1, especially also to read out initialization memory 70. Since it is advantageous if the communication is controlled by communications unit 30, internal interface 38 of communications unit 30 is preferably implemented as a so-called master interface, and internal interface 38 of the further components is arranged as a slave interface. The interface connection control unit 50—device interface 36—internal interface 36 also allows control unit 50 to access components provided with an internal interface 38. In particular, this interface connection may be used to read and possibly program memory contents of initialization memory 70 and memory unit 34.

Signal-processing unit 31 generates a digital absolute position value P from position signals S that are supplied to second subassembly 20.2 by first subassembly 20.1 via electrical lines 21, and transmits this value, possibly in response to a position request command of control unit 50, to communications unit 30 via internal interface 38. Toward this end, the functions of signal-processing unit 31 may include an analog-digital conversion, a detection of faulty position signals S, the selection of valid signals from a number of redundant position signals S, etc.

The function of reset unit 32, for example, may include monitoring the supply voltage of position-measuring device 20 and outputting a reset signal in the event of fluctuations of the supply voltage, in order to prevent undefined operating states. Among other things, reset unit 32 also ensures that a normal operation following the switch-on of position-measuring device 20 is enabled only when the supply voltage has exceeded a specific voltage level in a stable manner. The reset signal may be supplied both to peripheral units of second subassembly 20.2 (in the illustrated example, to communications unit 30 and signal-processing unit 31) and to first subassembly 20.1, via electrical lines 21.

Voltage-supply unit 33 stabilizes a supply voltage supplied to position-measuring device 20 by control unit 50, e. g., via data-transmission cable 52, and/or adapts the voltage level to the requirements of the components of the position-measuring device or first subassembly 20.1 and second subassembly 20.2. This may require voltage-supply unit 33 to provide multiple different outputs, possibly featuring different voltages, and to transmit them via electrical lines 21 to first subassembly 20.1. In the same manner, voltage-supply unit 33 may be suitable to generate one or more constant output voltage(s) from a variable input voltage.

In this exemplary embodiment, memory unit 34 is adapted to store the data held in initialization memory 70. Memory unit 34 is able to be read out and programmed via internal interface 38. The access to memory unit 34 by control unit 50 may take place via device interface 36 and internal interface 38 with the aid of communications unit 30.

Position-measuring device 20 is operable in at least two operating modes, e.g., in a standard operating mode and in an initialization mode. The standard operating mode is the operating mode in which position-measuring device 20 is used as intended for measuring position values and for their transmission to a control unit 50. The measuring and transmitting of the position values may be controlled by commands from control unit 50. Since first subassembly 20.1 of position-measuring device 20 is to be suitable for an operation in radiation region A, all components of first subassembly 20.1 that are required for the operation in the standard operating mode are provided as radiation-hardened components, which means that they are suitable for use in a radiation region A of a machine.

However, because second subassembly 20.2 of position-measuring device 20 is arranged in the radiation-proof region B (to the right of the dashed line), it is unnecessary to provide the components of second subassembly 20.2 with radiation-resistant (radiation-hardened) components.

Initialization memory 70, although arranged in first subassembly 20.1, is not provided as a radiation-hardened memory and thus is actually unsuitable for use in radiation region A. For this reason, the initialization mode is provided to transmit the content of initialization memory 70 into a memory situated in the radiation-proof region B. In this exemplary embodiment, memory unit 34 is located in second subassembly 20.2. Because the memory content of memory unit 34 rather than the content of initialization memory 70 is used in the standard operating mode, a change in the memory content of initialization memory 70 caused by the radiation with high-energy ionizing radiation has no effect on the performance reliability of position-measuring device 20.

The use of a non-radiation-resistant (radiation-hardened) memory component in radiation region A of a machine or system has no harmful effect on the other components of first subassembly 20.1, except for a possible change of the memory content. In other words, the performance reliability of first subassembly 20.1 in the standard operating mode is ensured, even if the memory component is exposed to high-energy ionizing radiation. Because the content of initialization memory 70 is relevant only in the initialization context, e.g., for the transmission into a memory operated in radiation-proof region B (in the exemplary embodiment, into memory unit 34) and remains unused in the further operation, a change in the memory content of initialization memory 70 has no effect on the operativeness of position-measuring device 20.

The activation of the initialization mode may be initiated automatically by control unit 50, for example, directly following the switch-on of position-measuring device 20. In the initialization mode, it is possible to transmit the data from initialization memory 70 to memory unit 34. In this context, it is advantageous if the data in initialization memory 70 are protected by data-checking mechanisms, such as by a CRC code or by redundant encoding. In this manner, for example, it is possible to determine whether initialization memory 70 has already been modified. It may even be possible to implement the initialization despite damaged memory cells, by using error-correction algorithms. Following the copying of the data, position-measuring device 20 transitions to the standard operating mode, either automatically or once again initiated by control unit 50.

Since it is generally sufficient to copy initialization memory 70 together with second subassembly 20.2 only once, that is, during the initialization of first subassembly 20.1, a locking mechanism may be provided, which makes it possible to determine whether or not an initialization has already taken place. An identification memory 71, for example, may be provided in first subassembly 20.1 for this purpose. This memory is adapted to be radiation-resistant and likewise equipped with an internal interface 38.

In a first variant, identification memory 71 is programmable and is programmed appropriately once initialization memory 70 has been copied. A single memory cell may possibly suffice for this purpose. The programming advantageously is irreversible and may be accomplished by melt-through (fusing) of a circuit track provided for this purpose. Another possibility consists of implementing the memory cells as transistor structures and of providing a conductive connection between the emitter and base of the transistor structure (Zener zapping or Zener antifuse). By reading out identification memory 71, it can be ascertained at any time whether the initialization has already taken place.

In another variant, an unequivocal identification (e.g., a serial number) that characterizes first subassembly 20.1 is stored in identification memory 71. This unequivocal identification can also be stored in memory unit 34 of second subassembly 20.2 during the initialization. By comparing the identification in identification memory 71 with the identification stored in memory unit 34, it is possible to ascertain whether or not an initialization has already occurred. In the former case, position-measuring device 20 may immediately be switched into the standard operating mode.

Based on the content of identification memory 71, possibly in conjunction with the identification stored in memory unit 34, control unit 50 is therefore able to decide whether an initialization will have to take place. As an additional safety measure, a safety query may be provided, for example, in that control unit 50 first displays the ascertained necessity of an initialization on a display unit (screen) and starts the initialization only after a service technician enables the initialization, e.g., the copying of the memory content of initialization memory 70 into memory unit 34, using an input device (keyboard, mouse, etc.), by a positive answer to the security query. In this manner, the service technician is able to recheck the correct assignment between first subassembly 20.1 and second subassembly 20.2 prior to the initialization.

Figure 3:
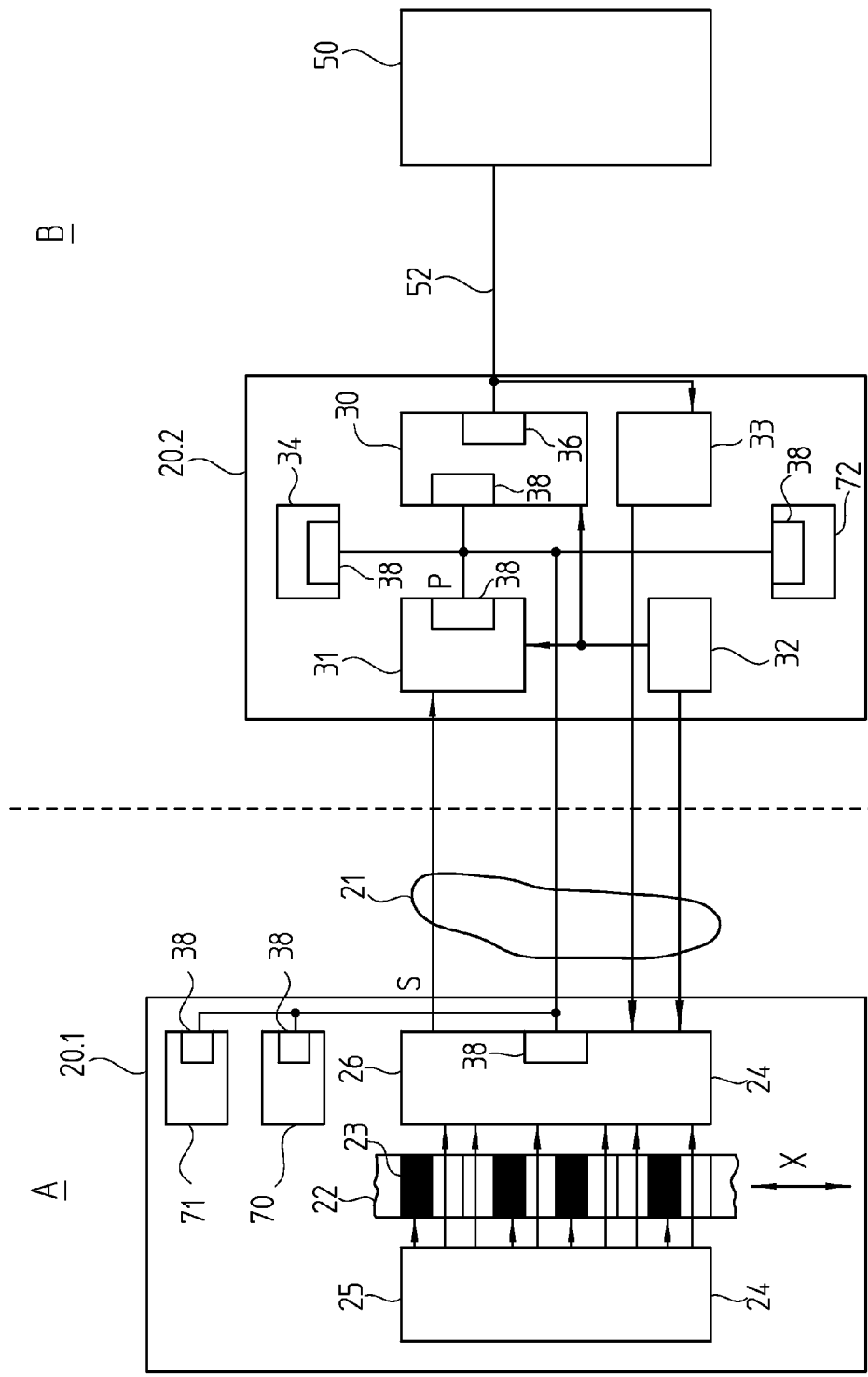
FIG. 3 is a block diagram of a position-measuring device according to an example embodiment of the present invention.

FIG. 3 is a block diagram of a position-measuring device 20 according to an example embodiment of the present invention. Components that were already described in conjunction with FIG. 2 have the same reference numeral and will not be described again.

In this exemplary embodiment, second subassembly 20.2 additionally includes a microcontroller 72, which is used as initialization unit. Microcontroller 72 is equipped with an internal interface 38, and thus is able to communicate with components of position-measuring device 20 that likewise have an internal interface 38 and are interconnected via this interface. The foregoing applies especially to initialization memory 70 and memory unit 34.

The initialization, e.g., especially the copying of the data of initialization memory 70 into memory unit 34, may be accomplished by microcontroller 72. Internal interface 38 of microcontroller 72 is arranged as a master interface for this purpose.

An advantage of this system is that the initialization is able to be performed in an autonomous manner, e.g., without the involvement of control unit 50. For example, after the switch-on, microcontroller 72 is able to determine on the basis of the content of identification memory 71 or by comparing the identification stored in initialization memory 71 with the identification stored in memory unit 34 (according to the two variants described above) whether an initialization is required. Accordingly, in the first case, it is able to switch position-measuring device 20 into the initialization mode, copy the content of initialization memory 70 into memory unit 34, and then switch over to the standard operating mode.

As an alternative, the initialization in this exemplary embodiment is also able to be initiated by control unit 50, but it is microcontroller 72 that implements the copying operation.

Figure 4:
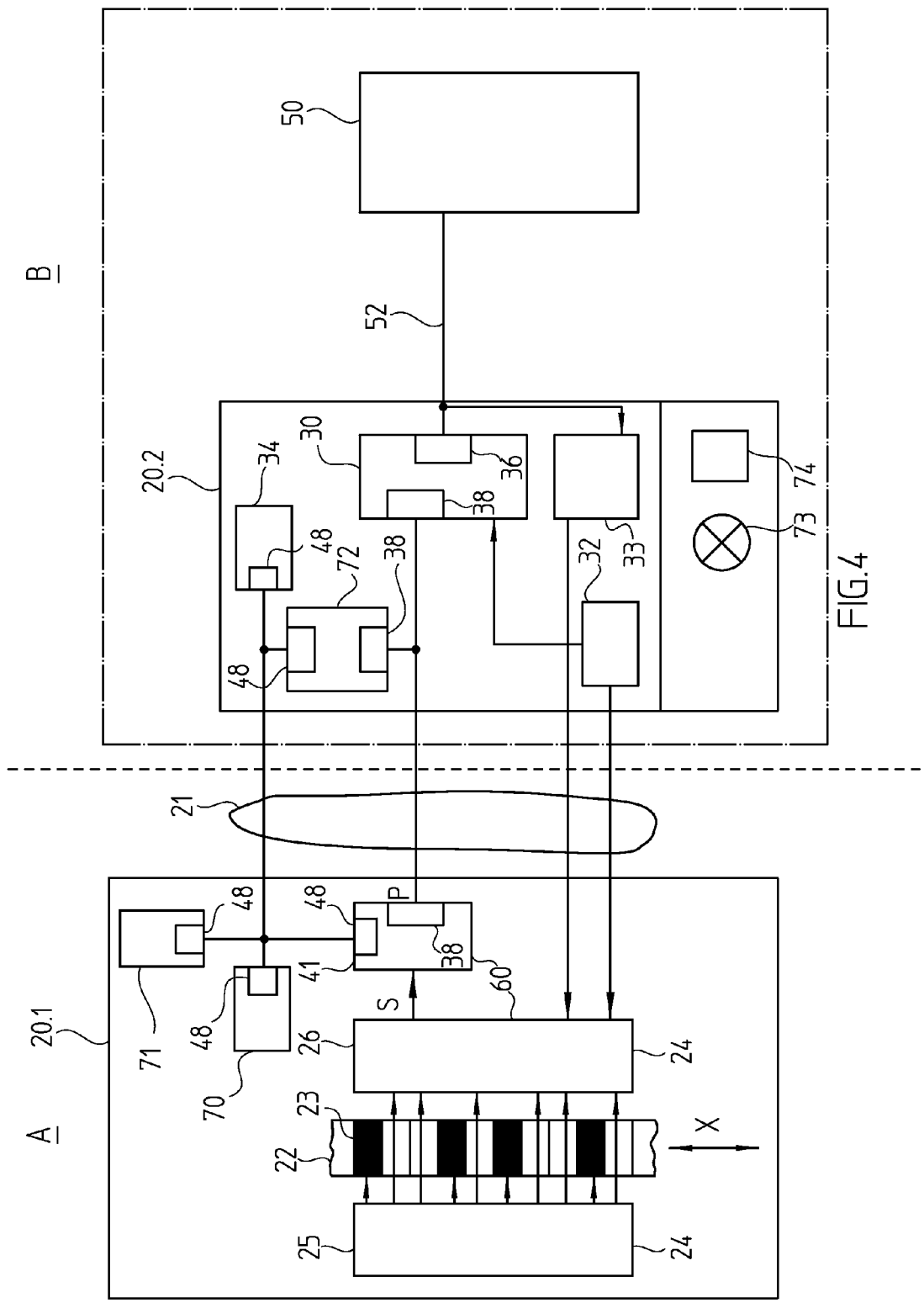
FIG. 4 is a block diagram of a position-measuring device according to an example embodiment of the present invention.

FIG. 4 is a block diagram of a position-measuring device 20 according to an example embodiment of the present invention. Components that were already described in previous exemplary embodiments bear the same reference numerals.

In a deviation from the previously described exemplary embodiments, initialization memory 70, memory unit 34, and microcontroller 72 are connected via a separate memory interface 48. In addition, an identification memory 71 may be provided here, as well, which likewise has a memory interface 48. An interface that is already available in conventional memory units 34 may be used as memory interface 48, such as an I2C interface, for example.

Microcontroller 72 may additionally be provided with an internal interface 38. This creates a communication channel between control unit 50 (via device interface 36 and internal interface 38) and microcontroller 72.

Also in a deviation from the exemplary embodiments described with reference to FIGS. 2 and 3, instead of signal-processing unit 31 in second subassembly 20.2, a signal-processing unit 41 is situated in first subassembly 20.1. This has the advantage that a digital absolute position value P is already generated in first subassembly 20.1, which may be transmitted via internal interface 38 to communications unit 30 of second subassembly 20.2. Since the data transmission takes place within the framework of a data-transmission protocol, a secure transmission of the digital absolute position values P to second subassembly 20.2 is able to be ensured by suitable measures (e.g., the generation and transmission of check sums, etc.). This applies especially when the physical distance between first subassembly 201 and second subassembly 20.2 is large (several meters) due to the distance between radiation region A and radiation-proof region B.

In order to achieve the best possible interference security in the data transmission between signal-processing unit 41 and communications unit 30, a differential data transmission, e.g., according to the RS-485 standard, is preferably used for the physical transmission in the case of internal interface 38, as well. However, because the corresponding driver components have the previously mentioned drawbacks (high price, problematic availability, large size), the physical transmission of the data may also be undertaken with the aid of single-ended digital signals. In all cases, electrical lines 21 via which the data transmission is carried out must be adapted to the selected physical transmission.

In addition to internal interface 38, signal-processing unit 41 also includes a memory interface 48. This allows it to read out or write memory contents of memory unit 34 directly, without a detour by communications unit 30. This, for example, reduces the loading of internal interface 38, which is advantageous in particular during the standard operating mode, in which internal interface 38 is predominantly required for transmitting position data P.

All methods for the initialization that have already been described in connection with the previous exemplary embodiments are likewise able to be implemented using the architecture illustrated in FIG. 4.

FIG. 4 illustrates yet another advantageous possibility for initiating the copying of data from initialization memory 70 to memory unit 34, e.g., with the aid of a signal transducer 73 and a switching element 74, which are provided on the housing of second subassembly 20.2. If microcontroller 72 (or control unit 50) detects, for example, based on the content of initialization memory 72, that no initialization has taken place yet for first subassembly 20.1, then the initialization mode and the copying procedure will not be started right away, but the service technician working on the system will first be informed with the aid of a signal from signal transducer 73 (e.g., lighting or blinking of a lamp) that an initialization needs to take place. The transition into the initialization mode is started only after the service technician operates switching element 74 (e.g., a push-button switch). In this manner, similar to the first exemplary embodiment, a security query is introduced in the initialization of a new first subassembly 20.1, which enables the service technician to check once again whether new first subassembly 20.1 was indeed connected to the correct second subassembly 20.2. Here, too, the transmission of the data from initialization memory 70 to memory unit 34 is started only once the security query has been answered positively (actuation of the switching element).

If device interface 36 and internal interface 38 have the same configuration, communications unit 30 may also include only the electromechanical connection (plug connector and electrical lines) between device interface 36 and internal interface 38. There is also the option of not providing any communications unit 30 at all in second subassembly 20.2.

The division selected in FIG. 4 is especially advantageous because in modern position-measuring devices 20, detector unit 24 and signal-processing unit 41 with corresponding interfaces 38, 48 are often jointly integrated in a large-scale integration module 60 (ASIC or, in case of optical scanning, Opto-ASIC). This means that only the large-scale integration module 60 needs to be properly readied for use in a system in which position-measuring device 20 may be exposed to ionising, high-energy radiation, since the other components of the first subassembly, e.g., light source 25 and measuring standard 22, already have the suitability for use in radiation region A, without requiring modifications.

As illustrated in FIG. 4, second subassembly 20.2 may be arranged in its own separate housing, physically separate from control unit 50. This has the advantage that control unit 50 need not know at all that position-measuring device 20 consists of two subassemblies. In systems that already use absolute position-measuring devices which are protected from the occurring radiation by complex shielding measures (such as lead coating), it is therefore particularly easy to exchange these position-measuring devices for position-measuring devices 20 and to remove the undesired weight of the shield. All that is required is a simple check regarding the compatibility of device interface 36.

It is also possible, as indicated by the block indicated as a dash-dotted line, to integrate second subassembly 20.2 into a control unit 50'.

Figure 5:
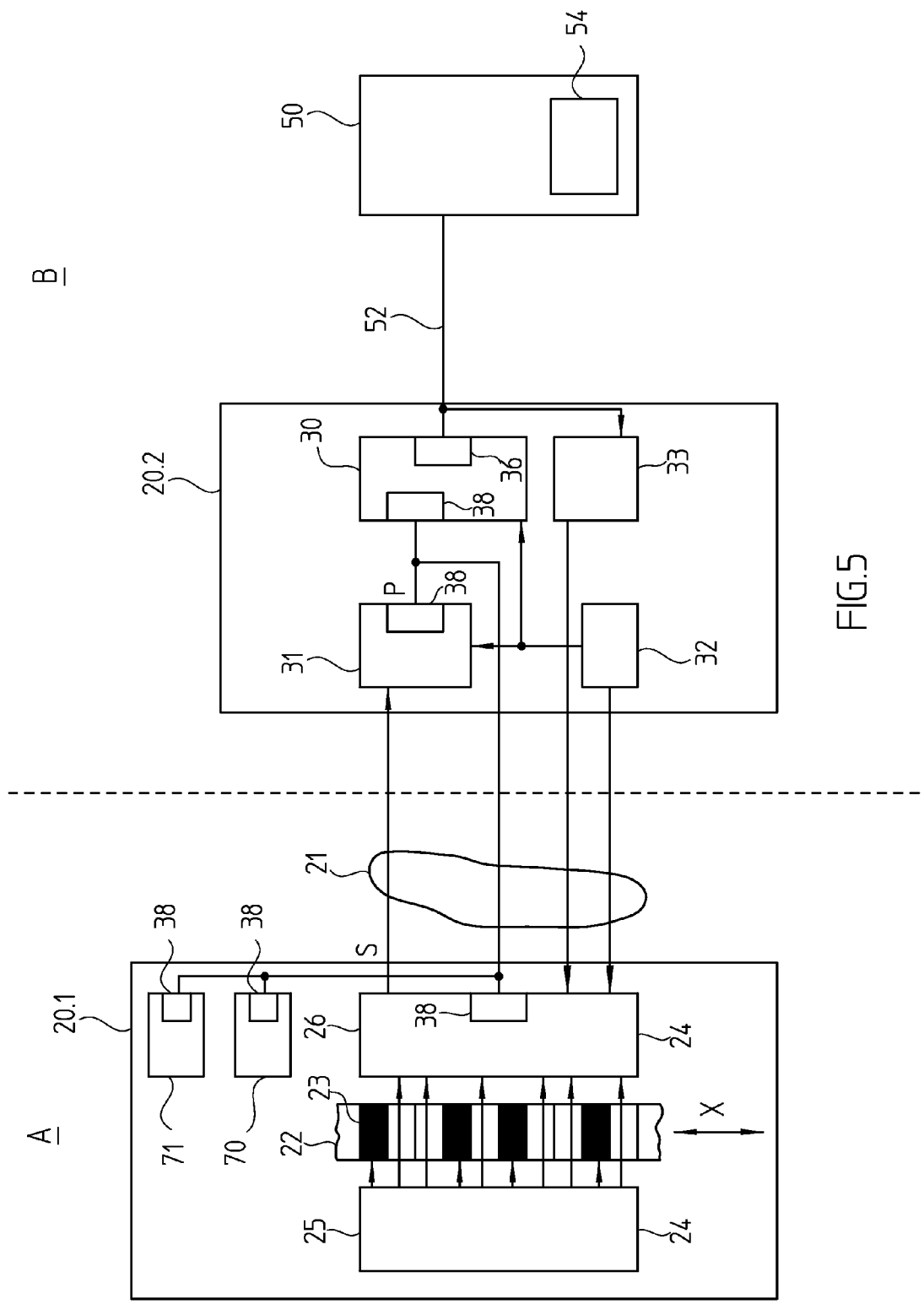
FIG. 5 is a block diagram of a position-measuring device according to an example embodiment of the present invention.

FIG. 5 illustrates a position-measuring device 20 according to an example embodiment of the present invention. Here, again, components that were already described in the previous exemplary embodiments, bear the same reference numerals.

In a deviation from the previously described exemplary embodiments, no memory unit is provided in second subassembly 20.2. Instead, a memory unit 54 suitable for storing the data of initialization memory 70 is provided in control unit 50. Accordingly, during the initialization of position-measuring device 20 or in the exchange of first subassembly 20.1, the content of initialization memory 70, especially the data required in the standard operating mode, are copied from initialization memory 70 into memory unit 54. The copying process is executed by control unit 50, the access to the initialization memory takes place via device interface 36 and internal interface 38, as previously described. In this exemplary embodiment, too, a security query may be provided prior to starting the copying process. During the standard operating mode, the data stored in memory unit 54 are then accessed.

What is claimed is:

1. An absolute position-measuring device, comprising:
a first subassembly having a measuring standard on which at least one coded track is provided, and a scanning unit adapted to generate position signals for generation of an absolute digital position value by scanning the at least one coded track in a measuring direction;
a second subassembly having at least one peripheral unit adapted to execute a supplementary or an auxiliary functionality of the position-measuring device; and
a plurality of electrical lines connecting the first subassembly and the second subassembly to each other for transmission of electrical signals;
wherein the position-measuring device is operable in an initialization mode and in a standard operating mode, all components of the first subassembly required for operation in the standard operating mode being suitable for use in a radiation region of a machine, the first subassembly including an initialization memory adapted to store data required for operation in the standard operating mode and being unsuitable for use in a radiation region of a machine, content of the initialization memory being transmittable in the initialization mode to a memory unit arranged outside the radiation region, the content of the memory unit being is used for operation in the standard operating mode.

2. The absolute position-measuring device according to claim 1, wherein the memory unit is arranged in the second subassembly.

3. The absolute position-measuring device according to claim 2, wherein the second subassembly includes a microcontroller adapted to transmit data from the initialization memory to the memory unit.

4. The absolute position-measuring device according to claim 1, wherein the memory unit is arranged in a control unit at which the position-measuring device is operated.

5. The absolute position-measuring device according to claim 1, wherein the first subassembly includes an identification memory suitable for use in the radiation region, content of the identification memory usable to determine whether a transmission of the data from the initialization memory to the memory unit is required.

6. The absolute position-measuring device according to claim 1, wherein the second subassembly includes a switching device adapted to start initialization upon actuation.

7. The absolute position-measuring device according to claim 1, wherein the second subassembly includes a signal transducer adapted to signal a required initialization.

8. The absolute position-measuring device according to claim 1, wherein the standard operating mode corresponds to an operating mode in which the position-measuring device is used to measure position values and transmit the position values to a control unit.

9. A method for operating an absolute position-measuring device, including: a first subassembly having a measuring standard on which at least one coded track is arranged, and a scanning unit, adapted to generate position signals for generation of an absolute digital position value by scanning the at least one coded track in a measuring direction; a second subassembly having at least one peripheral unit adapted to execute a supplementary or an auxiliary functionality of the position-measuring device; and a plurality of electrical lines connecting the first subassembly and the second subassembly to each other for transmission of electrical signals, comprising:
selectively operating the position-measuring device in an initialization mode and a standard operating mode, all components of the first subassembly required for operation in the standard operating mode being suitable for use in a radiation region of a machine;
in the initialization mode, transmitting content of an initialization memory to a memory unit arranged outside of the radiation region, the initialization memory being provided in the first subassembly, storing data required for operation in the standard operating mode, and being unsuitable for use in the radiation region; and
in the standard operating mode, using content of the memory unit.

10. The method according to claim 9, wherein the transmission of the content of the initialization memory to the memory unit is performed by a control unit adapted to operate the position-measuring device.

11. The method according to claim 9, wherein a microcontroller, arranged in the second subassembly as an initialization unit, performs the transmission of the content of the initialization memory to the memory unit.

12. The method according to claim 9, further comprising determining whether a transmission of data from the initialization memory to the memory unit is required based on content of an identification memory that is provided in the first subassembly and that is suitable for use in the radiation region.

13. The method according to claim 9, wherein the transmission of the content of the initialization memory is started only if a service technician provides a positive response to a security query.

14. The method according to claim 9, wherein the standard operating mode corresponds to an operating mode in which the position-measuring device is used to measure position values and transmit the position values to a control unit.

* * * * *